United States Patent
Shimizu et al.

(10) Patent No.: US 10,505,427 B2
(45) Date of Patent: Dec. 10, 2019

(54) ROTATING ELECTRICAL MACHINE SYSTEM

(71) Applicant: NISSAN MOTOR CO., LTD., Yokohama-shi, Kanagawa (JP)

(72) Inventors: Hirofumi Shimizu, Kanagawa (JP); Tomohiro Umino, Kanagawa (JP); Yasuyuki Kubota, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 102 days.

(21) Appl. No.: 15/514,184

(22) PCT Filed: Sep. 30, 2014

(86) PCT No.: PCT/JP2014/076183
§ 371 (c)(1),
(2) Date: Mar. 24, 2017

(87) PCT Pub. No.: WO2016/051535
PCT Pub. Date: Apr. 7, 2016

(65) Prior Publication Data
US 2017/0294821 A1   Oct. 12, 2017

(51) Int. Cl.
*H02K 5/20* (2006.01)
*H02K 9/19* (2006.01)
(Continued)

(52) U.S. Cl.
CPC ............. *H02K 5/20* (2013.01); *H02K 9/19* (2013.01); *H02K 9/22* (2013.01); *H02K 11/33* (2016.01); *H02M 7/48* (2013.01)

(58) Field of Classification Search
CPC . H02K 5/20; H02K 9/19; H02K 11/33; H02K 11/0073; H02K 5/225; H02M 7/48;
(Continued)

(56) References Cited

U.S. PATENT DOCUMENTS 5,491,370 A * 2/1996 Schneider .............. H02K 7/006
310/54
6,169,344 B1 * 1/2001 Tsuruhara ................ H02K 5/20
237/12.3 R
(Continued)

FOREIGN PATENT DOCUMENTS

CN    101548589 A    9/2009
CN    103683685 A    3/2014
(Continued)

*Primary Examiner* — Naishadh N Desai
(74) *Attorney, Agent, or Firm* — Foley & Lardner LLP

(57) ABSTRACT

A rotating electrical machine system integrally includes a rotating electrical machine housed in a first chamber of a housing and a semiconductor module housed in a second chamber of the housing and electrically coupled to the rotating electrical machine. The rotating electrical machine includes a stator secured to an inner circumference surface of the first chamber and a rotor rotatably disposed with respect to the stator. The rotating electrical machine system further includes a cooler disposed between a bottom portion of the second chamber and the semiconductor module to cool the semiconductor module and the stator by coolant that passes through an inside of the cooler.

11 Claims, 7 Drawing Sheets

(51) Int. Cl.
*H02M 7/48* (2007.01)
*H02K 9/22* (2006.01)
*H02K 11/33* (2016.01)

(58) Field of Classification Search
CPC .............. H01L 21/4878; H01L 23/473; H05K 7/20927
USPC .......................................... 310/68 D, 52–64
See application file for complete search history.

(56) References Cited

U.S. PATENT DOCUMENTS

| | | | |
|---|---|---|---|
| 6,198,183 B1 | 3/2001 | Baeumel et al. | |
| 6,339,271 B1* | 1/2002 | Noble | H02K 1/2786 29/598 |
| 7,728,467 B2 | 6/2010 | Aoki et al. | |
| 2003/0173839 A1* | 9/2003 | Torii | H02K 5/20 310/52 |
| 2005/0168081 A1* | 8/2005 | Takenaka | H02K 5/20 310/64 |
| 2007/0013241 A1* | 1/2007 | Schiferl | H02K 1/32 310/54 |
| 2008/0179972 A1* | 7/2008 | Aoki | H01L 21/4878 310/52 |
| 2008/0315703 A1* | 12/2008 | Lee | H02K 1/146 310/195 |
| 2010/0013331 A1 | 1/2010 | Yoshida et al. | |
| 2012/0313465 A1* | 12/2012 | Prix | H02K 5/20 310/54 |
| 2012/0326540 A1* | 12/2012 | Dorr | H02K 9/10 310/64 |
| 2013/0049495 A1 | 2/2013 | Matsuo | |
| 2013/0119793 A1* | 5/2013 | Hofkirchner | H02K 5/20 310/54 |
| 2014/0197701 A1* | 7/2014 | Hossain | H02K 9/22 310/52 |
| 2014/0232217 A1* | 8/2014 | Miyama | H02K 5/20 310/52 |
| 2015/0319839 A1 | 11/2015 | Ichikawa et al. | |
| 2015/0381010 A1 | 12/2015 | Kobes et al. | |

FOREIGN PATENT DOCUMENTS

| | | | |
|---|---|---|---|
| DE | 43 11 518 A1 | 10/1994 | |
| DE | 10 2008027002 A1 | 12/2009 | |
| DE | 10 2013201758 A1 | 8/2014 | |
| JP | 2005-224008 A | 8/2005 | |
| JP | 2008-131672 A | 6/2008 | |
| JP | 2009-44922 A | 2/2009 | |
| JP | 2014-101823 A | 6/2014 | |
| WO | WO-98/28833 A2 | 7/1998 | |
| WO | WO 9828833 A2 * | 7/1998 | ............... H02K 5/20 |
| WO | WO 2013/069321 A1 | 5/2013 | |
| WO | WO 2014/080572 A1 | 5/2014 | |

* cited by examiner

ROTATING ELECTRICAL MACHINE SYSTEM

TECHNICAL FIELD

The present invention relates to a rotating electrical machine system that integrally includes a rotating electrical machine and a semiconductor module coupled to the rotating electrical machine.

BACKGROUND ART

JP2005-224008A discloses a rotating electrical machine system that integrally includes an electrical motor as a rotating electrical machine and an inverter device that converts direct current into alternating current to supply to this electrical motor.

In this rotating electrical machine system, cooling passages for cooling a stator of the motor are disposed in a housing that houses the motor, a cooler for cooling a semiconductor module of the inverter device is installed on the housing in a state housed in an enclosure. The cooler is coupled to upstream-side and downstream-side cooling passages. Cooling water supplied from the upstream-side cooling passage to the cooler passes through an inside of the cooler to be discharged to the downstream-side cooling passage.

SUMMARY OF INVENTION

In the above-described rotating electrical machine system, cooling passages are not disposed below the inverter device, and the cooler of the inverter device is configured to cool only the semiconductor module, thus the stator of the motor positioned below the inverter device cannot be cooled. Therefore, the rotating electrical machine system of the prior art has a configuration that cannot efficiently cool the stator of the motor. Reduction of stator cooling efficiency may restricts a motor output depending on a motor operating state.

An object of the present invention is to provide a rotating electrical machine system that ensures effective cooling of both a semiconductor module and a stator of a rotating electrical machine without increasing a size of the system.

According to an aspect of this invention, a rotating electrical machine system integrally includes a rotating electrical machine housed in a first chamber of a housing and a semiconductor module housed in a second chamber of the housing and electrically coupled to the rotating electrical machine. The rotating electrical machine includes a stator secured to an inner circumference surface of the first chamber and a rotor rotatably disposed with respect to the stator. The rotating electrical machine system further includes a cooler disposed between a bottom portion of the second chamber and the semiconductor module to cool the semiconductor module and the stator by coolant that passes through an inside of the cooler.

DESCRIPTION OF EMBODIMENTS

Hereinafter, embodiments of the present invention will be described with reference to the drawings and the like.

(First Embodiment)

Figure 1:
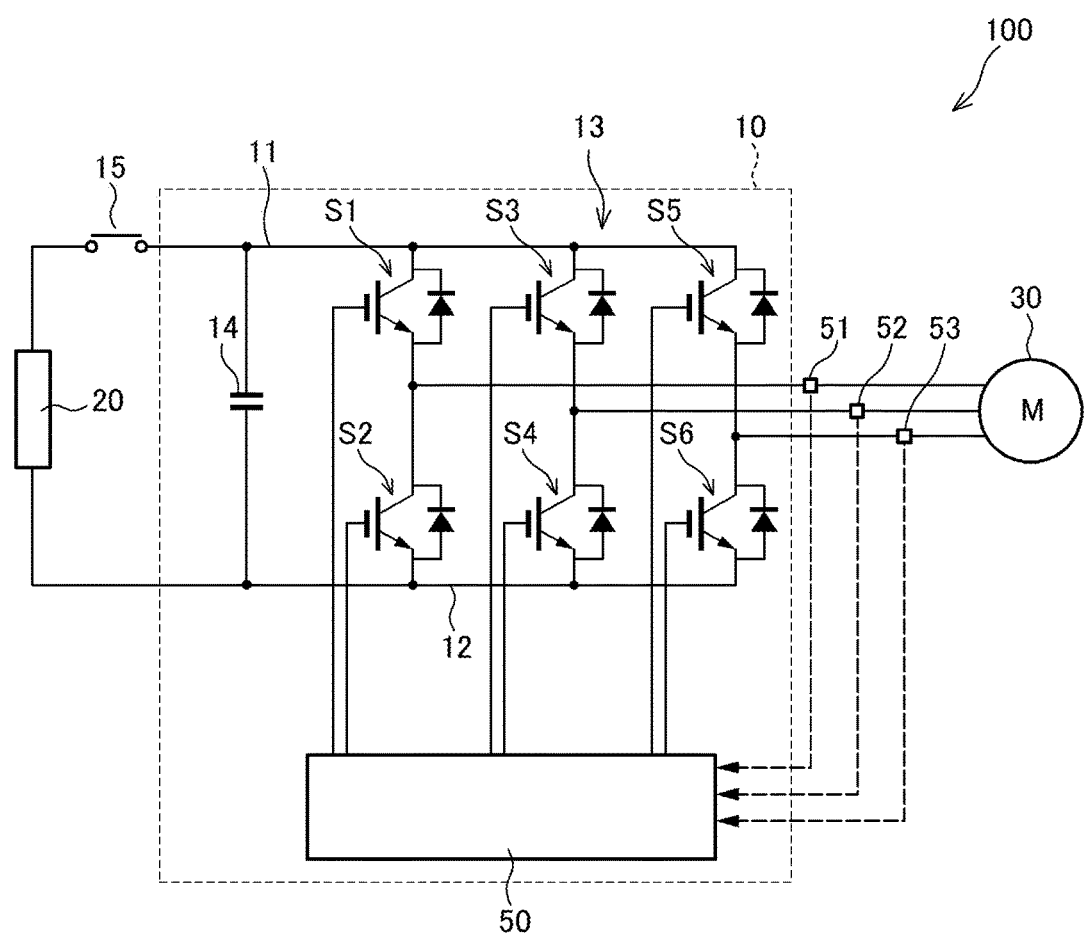
FIG. 1 is a schematic configuration diagram of a rotating electrical machine system according to a first embodiment.

The following describes a rotating electrical machine system 100 according to a first embodiment with reference to FIG. 1. FIG. 1 is a schematic configuration diagram of the rotating electrical machine system 100 according to the first embodiment.

The rotating electrical machine system 100 illustrated in FIG. 1 is a system mounted on, for example, an electric vehicle or a hybrid vehicle.

The rotating electrical machine system 100 includes a battery 20 as a power supply, an electrical motor 30 as a driving source that drives wheels, and an inverter 10 electrically coupled to the battery 20 and the motor 30. The rotating electrical machine system 100 is configured to drive the motor 30 using electric power discharged from the battery 20 and charge the battery 20 using electric power generated by the motor 30.

The battery 20, which is a rechargeable and dischargeable secondary battery, is constituted of, for example, a lithium-ion battery.

The electrical motor 30 is a three-phase AC motor that includes a U-phase terminal, a V-phase terminal, and a W-phase terminal. The motor 30, which is what is called a rotating electrical machine, functions as the driving source in normal operation, and functions as an electric generator in regeneration.

The inverter 10 is a power conversion apparatus electrically coupled between the battery 20 and the motor 30. The inverter 10 converts DC power of the battery 20 into AC power to supply the AC power to the motor 30 in normal operation. The inverter 10 converts AC power from the motor 30 into DC power to supply the DC power to the battery 20 in regeneration.

The inverter 10 includes a positive-side power line 11 and a negative-side power line 12. The positive-side power line 11 is coupled to a positive electrode of the battery 20 via a relay switch 15. The negative-side power line 12 is coupled to a negative electrode of the battery 20.

Between the positive-side power line 11 and the negative-side power line 12, a capacitor 14 that smooths voltage between the battery 20 and the inverter 10 is coupled. The capacitor 14 is coupled parallel to the battery 20.

The inverter 10 further includes a semiconductor module 13 including six switching elements S1 to S6. Each of the switching elements S1 to S6 of the semiconductor module 13 (a power module) includes an insulated gate bipolar transistor (IGBT) and a rectifier diode that allows current-flow in a direction opposite to the IGBT.

Between the positive-side power line 11 and the negative-side power line 12, the switching elements S1 and S2 are coupled in series as elements for U-phase, the switching elements S3 and S4 are coupled in series as elements for V-phase, and the switching elements S5 and S6 are coupled in series as elements for W-phase.

The U-phase terminal of the motor 30 is coupled to a coupling portion where the switching element S1 is coupled to the switching element S2. Furthermore, the V-phase terminal of the motor 30 is coupled to a coupling portion where the switching element S3 is coupled to the switching element S4. The W-phase terminal of the motor 30 is coupled to a coupling portion where the switching element S5 is coupled to the switching element S6.

The above-described six switching elements S1 to S6 are ON/OFF controlled based on a control signal from a controller 50. For example, the controller 50 is constituted of a microcomputer including a central processing unit (CPU), a read-only memory (ROM), a random access memory (RAM), and an input/output interface (I/O interface).

Detection signals of a current sensor 51 that detects U-phase current, a current sensor 52 that detects V-phase current, and a current sensor 53 that detects W-phase current are input to the controller 50. Other than these signals, detection signals from a voltage sensor that detects voltage of the battery 20, a rotating speed sensor that detects a rotating speed of the motor 30, and a similar sensor are input to the controller 50.

The controller 50 generates pulse-width modulation signals (PWM signals) based on, for example, the above-described detection signals and a torque command value from a vehicle controller (not illustrated) to perform switching control for the switching elements S1 to S6 of the semiconductor module 13 by PWM signals.

Figure 2:
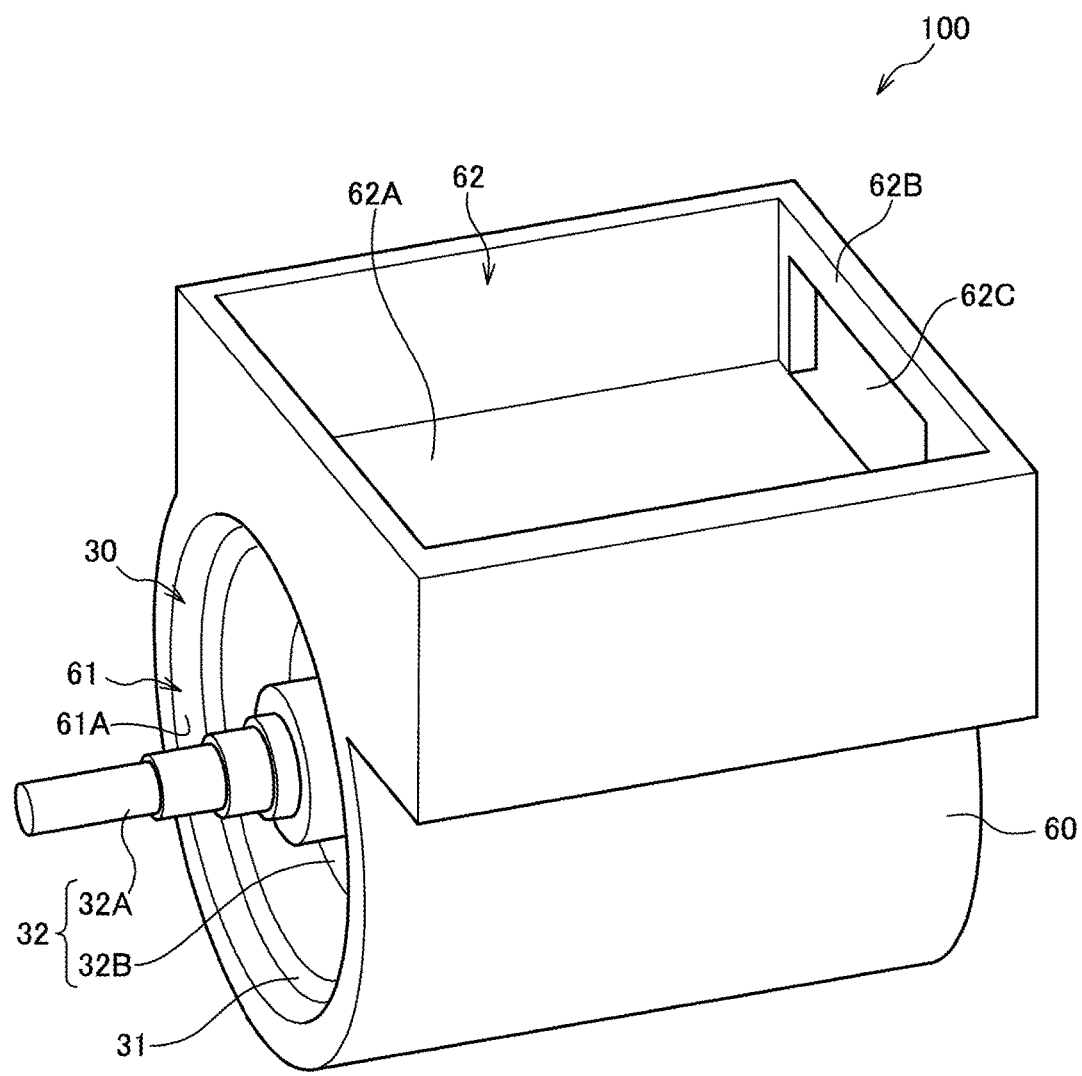
FIG. 2 is a perspective view of the rotating electrical machine system in a state where a semiconductor module is not installed.
Figure 3:
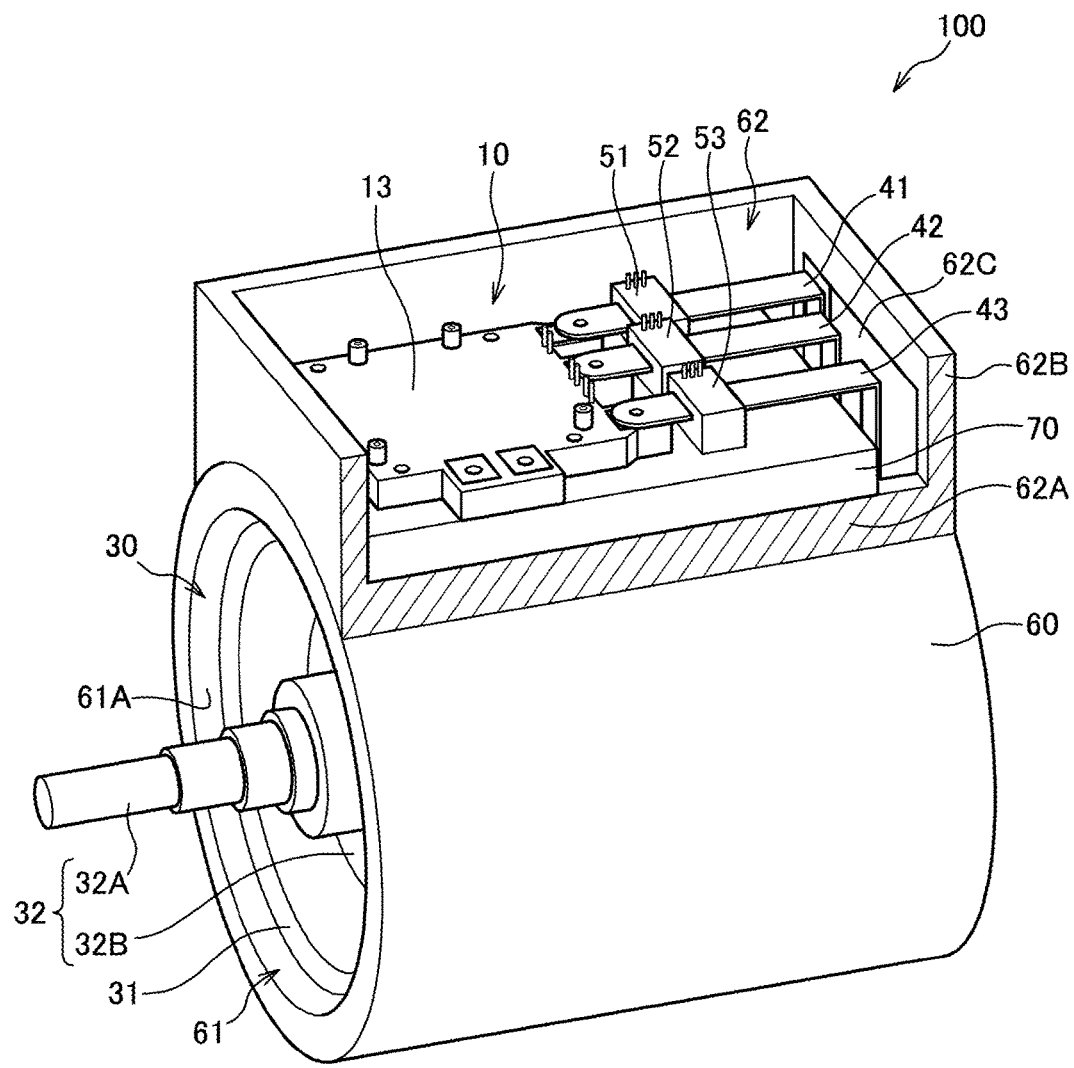
FIG. 3 is a perspective view of the rotating electrical machine system in a state where the semiconductor module is installed.

As illustrated in FIGS. 2 and 3, in the rotating electrical machine system 100, the motor 30 as the rotating electrical machine and the inverter 10 electrically coupled to the motor 30 are integrally disposed via a housing 60.

As illustrated in FIG. 2, the housing 60 is configured as a case member cast from, for example, aluminum alloy. The housing 60 includes a motor chamber 61 as a first chamber that houses the motor 30 and an inverter chamber 62 as a second chamber that houses the inverter 10.

The motor chamber 61 is formed as a space (cylindrical-shaped space) corresponding to an outer shape of the motor 30. The inverter chamber 62 is formed as a space (box-shaped space) having a bottom portion 62A and a sidewall portion 62B. The motor chamber 61 and the inverter chamber 62 are arranged alongside in a vertical direction. After the inverter 10 is mounted on the inverter chamber 62, an upper opening of the inverter chamber 62 may be obstructed by a lid member (not illustrated).

The motor 30 includes a stator 31 secured to an inner circumference surface 61A of the motor chamber 61 and a rotor 32 disposed inside the stator 31 rotatably with respect to the stator 31.

The rotor 32 includes a rotating shaft 32A and a rotor core 32B mounted on an outer periphery of the rotating shaft 32A. The rotor core 32B is a cylindrical member constituted of lamination of a plurality of electromagnetic steel plates. Some permanent magnets are disposed inside the rotor core 32B.

The stator 31 is formed into an annular shape so as to surround an outer periphery of the rotor 32. The stator 31 is secured within the motor chamber 61 such that an outer peripheral surface of the stator 31 adheres to the inner circumference surface 61A of the motor chamber 61, by using a method such as a shrink fit. The stator 31 includes a plurality of teeth portions. A U-phase coil, a V-phase coil, and a W-phase coil are wound around these teeth portions in order.

As illustrated in FIG. 3, the inverter chamber 62 of the housing 60 houses the inverter 10. That is, in the inverter chamber 62, the semiconductor module 13, the capacitor 14, the controller 50, etc. that constitute the inverter 10 are disposed.

The semiconductor module 13 including the switching elements 51 to S6 is installed on the bottom portion 62A (bottom surface) of the inverter chamber 62 via a cooler 70. In order to facilitate an assemble of the rotating electrical machine system 100, the cooler 70 is secured to the bottom portion 62A of the inverter chamber 62 via securing mechanisms such as bolts, in a state that the semiconductor module 13 is mounted on the cooler 70. The cooler 70 is a cooling mechanism that cools the semiconductor module 13 generating heat in switching control. The cooler 70 will be described later in detail with reference to FIG. 4.

The semiconductor module 13 is housed in the inverter chamber 62, in a state that the semiconductor module 13 is placed on the cooler 70. The U-phase, V-phase, and W-phase coupling portions of the semiconductor module 13 are electrically coupled to the U-phase, V-phase, and W-phase terminals of the motor 30 via U-phase, V-phase, and W-phase busbars 41, 42, and 43 respectively. On the U-phase, V-phase, and W-phase busbars 41, 42, and 43, current sensors 51, 52, and 53 corresponding to the respective phases are disposed.

The sidewall portion 62B of the inverter chamber 62 has a through-hole 62C at a rear end of the housing 60. The motor chamber 61 has a rear end formed as an opening end. The U-phase, V-phase, and W-phase busbars 41, 42, and 43 are coupled to the motor 30 and the semiconductor module 13 through the through-hole 62C of the sidewall portion 62B and the opening end of the motor chamber 61.

In the above-described rotating electrical machine system 100, when the motor 30 is driven, the stator 31 of the motor 30 and the semiconductor module 13 of the inverter 10 generate heat. Therefore, the rotating electrical machine system 100 includes a cooling mechanism that cools the stator 31 of the motor 30 and the semiconductor module 13 of the inverter 10.

Figure 4:
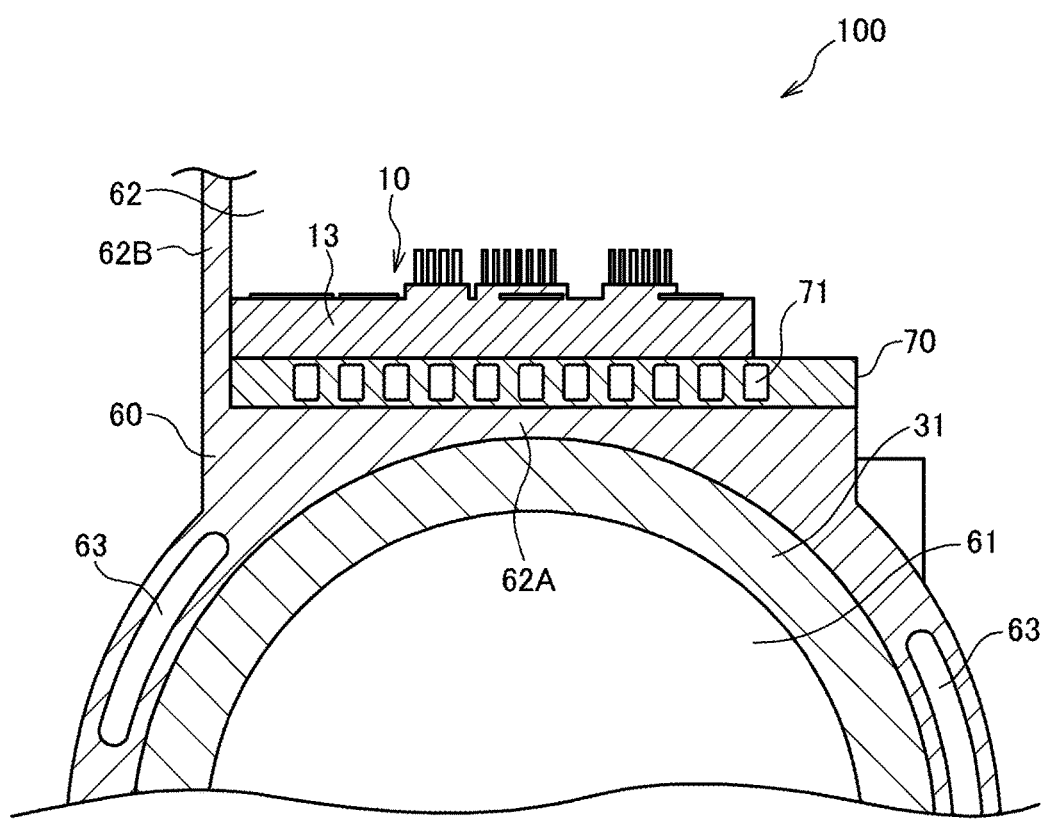
FIG. 4 is a part of a vertical cross-sectional view of the rotating electrical machine system.

The following describes the cooling mechanism of the rotating electrical machine system 100 with reference to FIG. 4. FIG. 4 is a part of a vertical cross-sectional view of the rotating electrical machine system 100.

As illustrated in FIG. 4, the rotating electrical machine system 100 according to this embodiment includes a cooling path 63 and the cooler 70 as the cooling mechanism.

The cooling path 63 is formed in the housing 60 around the stator 31 of the motor 30. The cooling path 63 is formed to extend in a rotation shaft direction along an outer periphery of the stator 31. The cooling path 63 is a passage where cooling water (coolant) flows. The cooling water flows through the cooling path 63 to cool the stator 31 near the cooling path 63. Thus, the cooling path 63 is configured as the cooling mechanism for cooling the stator 31 of the motor 30. The plurality of cooling paths 63 may be disposed around the starter 31. The cooling path 63 may be configured as one passage disposed to extend along a peripheral area of the stator 31.

It should be noted that the coolant that flows through the cooling path 63 is not necessarily cooling water. The coolant may be liquid such as oil or gas such as air.

The cooler 70 is disposed so as to interpose (be sandwiched) between the bottom portion 62A of the inverter chamber 62 and the semiconductor module 13. The cooler 70, which is a rectangular plate-shaped member, internally includes a plurality of flow paths 71. The flow path 71 is formed as a passage configured to extend in the rotation shaft direction of the motor 30.

The plurality of flow paths 71 are disposed alongside in a direction (a motor-width direction) perpendicular to the rotation shaft direction, and each are disposed in parallel. The flow path 71 of the cooler 70 is a passages where the cooling water (the coolant) flows. The cooling water flows through the flow path 71 to cool both the semiconductor module 13 of the inverter 10 and the stator 31 of the motor 30.

Thus, the cooler 70 is configured as the cooling mechanism that ensures cooling not only the semiconductor module 13 of the inverter 10 positioned above the cooler 70 but also the stator 31 of the motor 30 positioned below the cooler 70. The cooler 70 cools the semiconductor module 13 and the stator 31, thus volume and a shape of the flow path 71 are designed to be able to cool both members: the semiconductor module 13 and the stator 31. It should be noted that the flow path 71 may be configured as one passage formed to extend with meandering along a lower surface of the semiconductor module 13.

In this embodiment, the cooler 70 and the cooling path 63 are configured such that the cooling water that flows into the flow paths 71 from an inlet portion of the cooler 70 passes through the flow paths 71 to flow into the cooling path 63 through an outlet portion of the cooler 70. Then, the cooling water that has passed through the cooling path 63 is cooled by a heat radiation mechanism (not illustrated) to be supplied to the cooler 70 again. Thus, the cooling water that passes through the flow paths 71 of the cooler 70 and the cooling water that passes through the cooling path 63 are shared. An allowable upper-limit temperature of the semiconductor module 13 is lower than an allowable upper-limit temperature of the stator 31, thus in a case where the cooling water is shared, it is preferred that the cooling water cooled by the heat radiation mechanism is supplied to the cooler 70 in advance of the cooling path 63.

It should be noted that the cooling water is shared in this embodiment, however different cooling-water supply sources may be used to separately supply the cooling water to the cooler 70 and the cooling path 63.

As described above, the cooling mechanism of the rotating electrical machine system 100 includes the cooling path 63 and the cooler 70. The cooler 70 cools both the semiconductor module 13 and the stator 31, thus the cooling path 63 is disposed in the housing 60 so as to avoid a part (immediately below the cooler 70) positioned between the cooler 70 and the stator 31. This can avoid overlap of a cooling range of the cooling path 63 and a cooling range of the cooler 70.

The above-described rotating electrical machine system 100 of the first embodiment can obtain the following effect.

The rotating electrical machine system 100 includes the cooler 70 separately from the cooling path 63 for stator cooling formed in the housing 60. The cooler 70 is sandwiched between the bottom portion 62A of the inverter chamber 62 and the semiconductor module 13. The cooler 70 is configured to cool both the semiconductor module 13 of the inverter 10 and the stator 31 of the motor 30 by the cooling water that passes through an inside of the cooler 70.

The cooler 70 is used for both of the cooling mechanism of the semiconductor module 13 and the cooling mechanism of the stator 31, thus it is possible to ensure effective cooling of the semiconductor module 13 and the stator 31 without increasing a size of the rotating electrical machine system 100. Consequently, this ensures a high-output-power operation for a long time of the motor 30.

The interposition of the cooler 70 as the plate-shaped member between the semiconductor module 13 and the stator 31 ensures reinforcement of the bottom portion 62A of the inverter chamber 62 and ensures a housing strength even if the bottom portion 62A is configured thin to some extent.

It should be noted that the cooler 70 is configured to cool the semiconductor module 13 that constitutes a part of the inverter 10, however the cooler 70 may be configured to cool a semiconductor module of an electric component (such as a converter) coupled to the motor 30 other than the inverter 10.

In the rotating electrical machine system 100, the cooling path 63 for stator cooling is disposed in the housing 60 around the stator 31. In the cooling path 63 and the cooler 70, the cooling water that passes through the cooling path 63 and the cooling water that passes through the cooler 70 are shared. Thus, sharing of the cooling water also ensures sharing of, for example, the cooling-water supply source and the heat radiation mechanism of the cooling water. It is possible to suppress the increase of the size of the rotating electrical machine system 100.

Furthermore, in the rotating electrical machine system 100, the cooling path 63 is formed in the housing 60 so as to avoid the part (immediately below the cooler 70) positioned between the cooler 70 and the stator 31. This can avoid the overlap of the cooling range of the cooling path 63 and the cooling range of the cooler 70, thus ensuing the effective cooling of the stator 31 and the semiconductor module 13 while suppressing the increasing of the size of the rotating electrical machine system 100.

(Second Embodiment)

Figure 5:
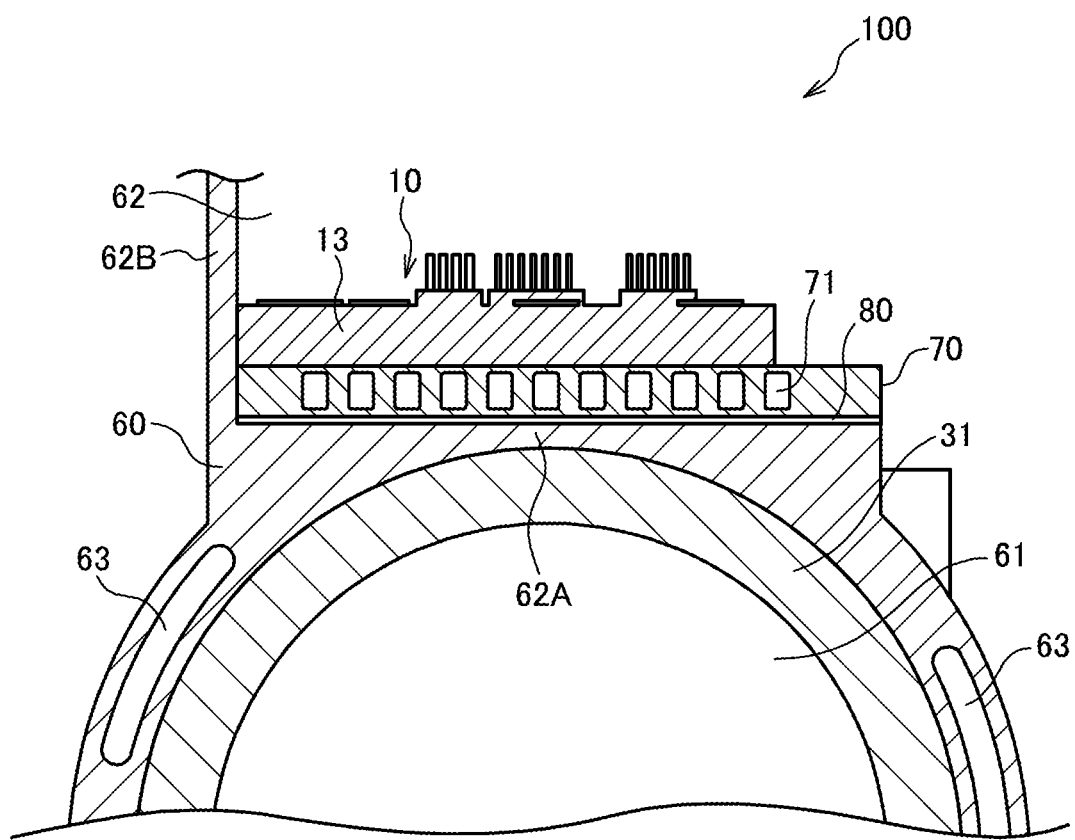
FIG. 5 is a part of a vertical cross-sectional view of a rotating electrical machine system according to a second embodiment.

The following describes a rotating electrical machine system 100 according to a second embodiment with reference to FIG. 5.

The rotating electrical machine system 100 according to the second embodiment is different from the system of the first embodiment, in that a heat-transfer improving member 80 is interposed between the cooler 70 and the bottom portion 62A of the inverter chamber 62. It should be noted that the following embodiments use identical reference numerals to components that have functions identical to those of the first embodiment, and therefore such elements may not be further elaborated here.

As illustrated in FIG. 5, in the rotating electrical machine system 100 according to the second embodiment, the heat-transfer improving member 80 is disposed (sandwiched) between the cooler 70 and the bottom portion 62A of the inverter chamber 62.

The heat-transfer improving member 80 is a grease layer formed such that grease is applied between a lower end surface of the cooler 70 and the bottom portion 62A of the inverter chamber 62, or an elastic body having thermal conductivity higher than that of air. The elastic body is disposed between the lower end surface of the cooler 70 and the bottom portion 62A of the inverter chamber 62.

In the rotating electrical machine system 100 according to the second embodiment, sandwiching the heat-transfer improving member 80 by the cooler 70 and the bottom portion 62A ensures gapless contacts of the cooler 70 and the heat-transfer improving member 80, and the bottom portion 62A and the heat-transfer improving member 80. This ensures reduction of thermal resistance between the respective members to more efficiently cool the stator 31 of the motor 30 by the cooler 70.

It should be noted that in the second embodiment, the heat-transfer improving member 80 is disposed between the cooler 70 and the bottom portion 62A, however surface processing for reducing surface roughness may be performed on at least one surface of the lower end surface (an installation surface) of the cooler 70 and a bottom portion surface of the inverter chamber 62 instead of the disposition of the heat-transfer improving member 80.

Thus, performing the surface processing ensures the gapless contact of the cooler 70 and the bottom portion 62A to increase a contacted area of both members. This ensures the reduction of the thermal resistance between the cooler 70 and the bottom portion 62A. Therefore, it is possible to more efficiently cool the stator 31 by the cooler 70 even without the heat-transfer improving member 80.

A surface of the housing 60 formed by casting tends to harshen. Thus, it is preferred that the surface processing for reducing the surface roughness is performed on the surface of the bottom portion 62A of the inverter chamber 62 formed as a part of the housing 60, in the case where the surface processing is performed on only one of the cooler 70 and the bottom portion 62A.

Furthermore, in the state where the surface processing is performed on at least one of the cooler 70 and the bottom portion 62A, the heat-transfer improving member 80 may be disposed between the cooler 70 and the bottom portion 62A.

(Third Embodiment)

Figure 6A:
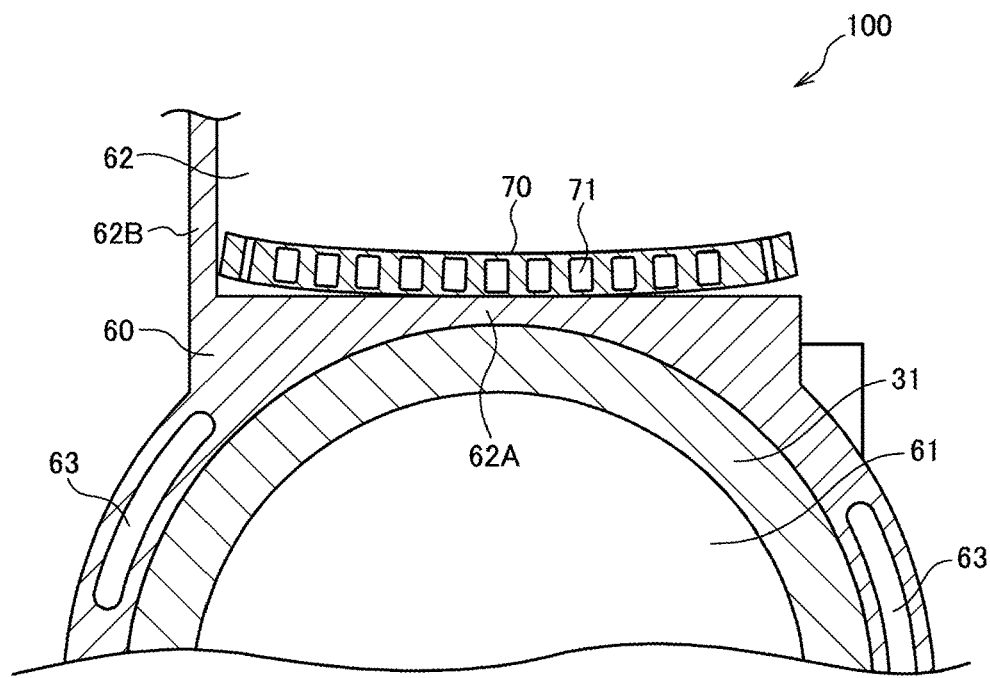
FIG. 6A is a part of a vertical cross-sectional view of a rotating electrical machine system according to a third embodiment.
Figure 6B:
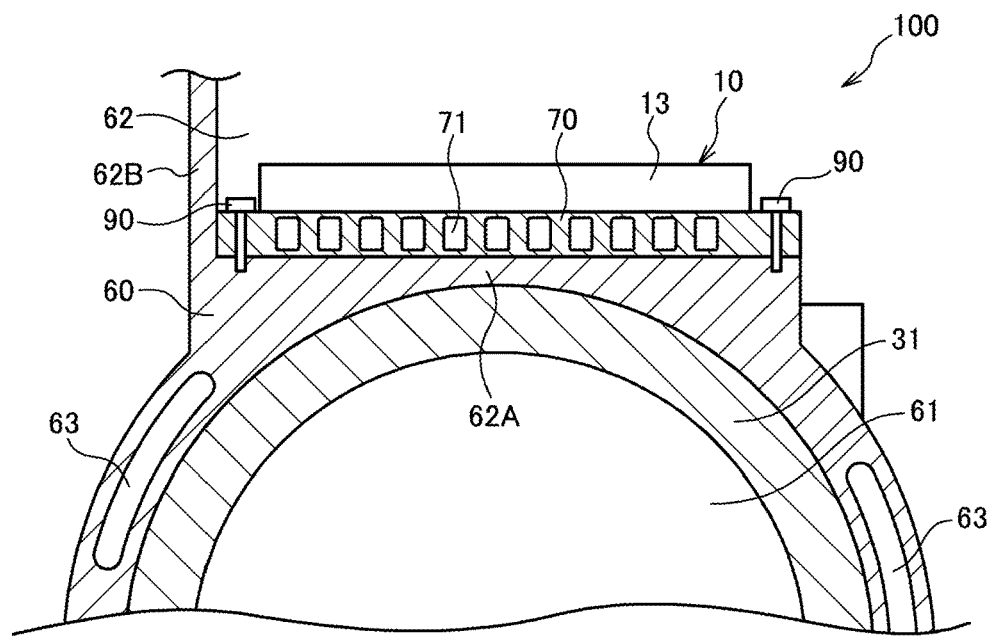
FIG. 6B is a part of a vertical cross-sectional view of the rotating electrical machine system in a state where a semiconductor module is installed.

The following describes a rotating electrical machine system 100 according to a third embodiment with reference to FIG. 6A and FIG. 6B.

The rotating electrical machine system 100 according to the third embodiment is different from the systems of the first and the second embodiments in a method of the installation of the cooler 70.

As illustrated in FIG. 6A, the cooler 70 before being secured to the bottom portion 62A of the housing 60 is configured as a plate-shaped member curved in the motor-width direction. That is, the lower end surface (the installation surface) of the cooler 70 has a curved shape where a central portion in the motor-width direction projects to the bottom portion 62A of the inverter chamber 62. Since the cooler 70 has a relatively simple plate shape, the cooler 70 can be manufactured using a method such as an extrusion molding.

As illustrated in FIG. 6B, the curve-shaped cooler 70 is placed on the bottom portion 62A of the inverter chamber 62. After that, the cooler 70 is secured to the bottom portion 62A by a plurality of bolts 90 as the securing mechanisms.

These bolts 90 are disposed along an outer edge of the cooler 70. The bolts 90 are disposed in at least four corners of the cooler 70, which is the rectangular plate shape, however the bolts 90 may be disposed along an outer periphery of the cooler 70 in addition to the four corners. The bolts 90 are screwed with screw holes of the bottom portion 62A through bolt insertion holes of the cooler 70. This tightly secures the cooler 70 to the bottom portion 62A in a state where the cooler 70 is deformed from the curved shape to a flat-plate shape.

In the rotating electrical machine system 100 according to the third embodiment, the cooler 70 having the shape curved in the motor-width direction is tightly secured to the bottom portion 62A of the inverter chamber 62 by the plurality of bolts 90 disposed along the outer edge of this cooler 70.

Thus, tightly securing ensures the tight contact of the cooler 70 and the bottom portion 62A in a state that maintains a high contact surface pressure, even at the central portion of the cooler 70 not only at the proximity of the bolts 90. This ensures the gapless contact of the cooler 70 and the bottom portion 62A to reduce the thermal resistance between both members. Consequently, it is possible to more efficiently cool the stator 31 of the motor 30 using the cooler 70.

When the stator 31 is disposed in the motor chamber 61 of the housing 60 by the shrink fit, the surface of the bottom portion 62A of the inverter chamber 62 curves in the motor-width direction corresponding to an outer peripheral shape of the stator 31. That is, the bottom portion 62A has a curved shape where a central portion in the motor-width direction projects to a side of the cooler 70.

Thus, when the bottom portion 62A has the curved shape, the cooler 70 may be a flat plate-shaped member, not the curved plate-shaped member. Securing the cooler 70 to the bottom portion 62A, which curves in the motor-width direction, by the plurality of bolts 90, which are disposed along the outer edge of the cooler 70, also ensures the tight contact of the cooler 70 and the bottom portion 62A in the state that maintains the high contact surface pressure. Consequently, it is possible to more efficiently cool the stator 31 of the motor 30 using the cooler 70.

In the above-described rotating electrical machine system 100 of the third embodiment, the heat-transfer improving member described in the second embodiment may be disposed between the cooler 70 and the bottom portion 62A, and the surface processing described in the second embodiment may be performed on the cooler 70 arid the bottom portion 62A.

Figure 7:
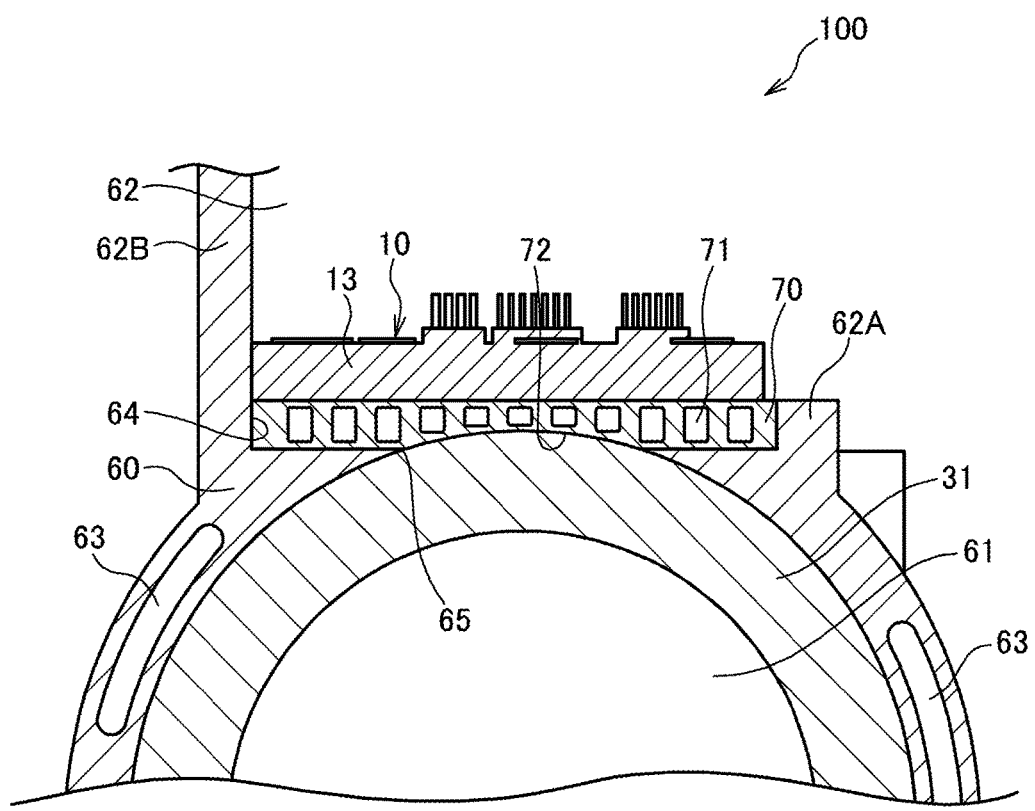
FIG. 7 is a part of a vertical cross-sectional view of a rotating electrical machine system according to a fourth embodiment.

(Fourth Embodiment) The following describes a rotating electrical machine system 100 according to a fourth embodiment with reference to FIG. 7.

The rotating electrical machine system 100 according to the fourth embodiment is different from the systems of the first to the third embodiments in that a part of the cooler 70 is exposed to the motor chamber 61.

As illustrated in FIG. 7, a depressed groove 64 where the cooler 70 is engaged, and a communication hole 65 through which the inverter chamber 62 is communicated with the motor chamber 61 are formed at the bottom portion 62A of the inverter chamber 62.

The cooler 70 is disposed in the depressed groove 64 of the bottom portion 62A by a method such as a press fit or the shrink fit. In such disposed state, a part of the cooler 70 is exposed to the motor chamber 61 through the communication hole 65. The exposed part, which is exposed through the communication hole 65, of the cooler 70 is formed as a depressed portion 72 depressed corresponding to the outer peripheral shape of the stator 31 of the motor 30. The depressed portion 72 of the cooler 70 is configured so as to contact the stator 31.

In the rotating electrical machine system 100 according to the fourth embodiment, the depressed portion 72 (the exposed part) of the cooler 70 is exposed to the motor chamber 61 through the communication hole 65, and contacts the outer peripheral surface of the stator 31. This ensures direct cooling of the stator 31 of the motor 30 via the cooler 70. Consequently, it is possible to more efficiently cool the stator 31 of the motor 30 using the cooler 70.

It should be noted that an exposed part at the lower end surface of the cooler 70 may be formed as a flat surface. In this case, a part of the outer peripheral surface of the stator 31 is formed as a flat surface such that the lower end surface, which is exposed through the communication hole 65, of the cooler 70 contacts the outer peripheral surface of the stator 31.

In the above-described rotating electrical machine system 100 of the fourth embodiment, the heat-transfer improving member described in the second embodiment may be disposed between the cooler 70 and the stator 31, and the surface processing described in the second embodiment may be performed on the cooler 70 and the stator 31.

The embodiments of the present invention described above are merely illustration of some application examples of the present invention and not of the nature to limit the technical scope of the present invention to the specific constructions of the above embodiments.

While the above-described respective embodiments are described as a single embodiment, they may be combined as necessary.

The invention claimed is:

1. A rotating electrical machine system comprising:
    a housing comprising a first chamber and a second chamber;
    a rotating electrical machine comprising a stator and a rotor, the stator being housed in the first chamber and secured to an inner circumference surface of the first chamber, the rotor being rotatably disposed with respect to the stator;
    a semiconductor module housed in the second chamber and electrically coupled to the rotating electrical machine; and
    a cooler housed in the second chamber and configured to cool the semiconductor module by a coolant that passes through an inside of the cooler, the cooler internally comprising a flow path through which the coolant flows,
    wherein the first chamber and the second chamber are arranged alongside in a vertical direction as a radial direction of the rotating electrical machine, and
    the cooler is sandwiched between a bottom portion of the second chamber positioned above the first chamber and a lower portion of the semiconductor module so as to cool both the semiconductor module and the stator.

2. The rotating electrical machine system according to claim 1,
    wherein the housing includes a cooling path disposed around the stator to cool the stator by a coolant that passes through an inside of the cooling path, and
    the coolant that passes through the cooling path and the coolant that passes through the cooler are shared.

3. The rotating electrical machine system according to claim 2,
    wherein the cooling path is formed in the housing so as to avoid a part positioned between the cooler and the stator.

4. The rotating electrical machine system according to claim 1,
    wherein a heat-transfer improving member is disposed between the bottom portion of the second chamber and the cooler.

5. The rotating electrical machine system according to claim 1,
    wherein surface processing for reducing surface roughness is performed on at least one of the bottom portion of the second chamber or an end surface of a bottom portion of the cooler.

6. The rotating electrical machine system according to claim 1,
    wherein one of the bottom portion of the second chamber or an end surface of a bottom portion of the cooler has a curved shape whose central portion projects to another, and
    the cooler is tightly secured to the bottom portion of the second chamber by a plurality of securing mechanisms disposed along an outer edge of the cooler.

7. The rotating electrical machine system according to claim 1,
    wherein a communication hole through which the second chamber is communicated with the first chamber is formed at the bottom portion of the second chamber, and
    the cooler is configured to contact the stator through the communication hole.

8. The rotating electrical machine system according to claim 1,
    wherein the cooler is a plate-shaped member.

9. The rotating electrical machine system according to claim 1,
    wherein the semiconductor module is a part of an inverter.

10. The rotating electrical machine system according to claim 1,
    wherein the flow path penetrates the inside of the cooler such that the coolant flows through the flow path between the bottom portion of the second chamber and the lower portion of the semiconductor module.

11. The rotating electrical machine system according to claim 1,
    wherein the flow path is formed as a passage extending in a rotation shaft direction of the rotor.

* * * * *